(12) United States Patent
Edwards

(10) Patent No.: US 12,097,954 B2
(45) Date of Patent: Sep. 24, 2024

(54) MOVEABLE WING TIP ARRANGEMENTS AND METHODS

(71) Applicant: AIRBUS OPERATIONS LIMITED, Bristol (GB)

(72) Inventor: Henry Edwards, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 15 days.

(21) Appl. No.: 17/971,549

(22) Filed: Oct. 21, 2022

(65) Prior Publication Data
US 2023/0131881 A1    Apr. 27, 2023

(30) Foreign Application Priority Data

Oct. 27, 2021 (GB) .................................... 2115422

(51) Int. Cl.
*B64C 3/56* (2006.01)
*B64C 3/18* (2006.01)
*B64C 9/06* (2006.01)

(52) U.S. Cl.
CPC ............ *B64C 3/56* (2013.01); *B64C 3/185* (2013.01); *B64C 9/06* (2013.01)

(58) Field of Classification Search
CPC .......... B64C 3/56; B64C 3/546; B64C 23/072
See application file for complete search history.

(56) References Cited

U.S. PATENT DOCUMENTS

| | | | |
|---|---|---|---|
| 2012/0112005 A1* | 5/2012 | Chaussee | B64C 23/072 244/123.1 |
| 2017/0043864 A1 | 2/2017 | Axford et al. | |
| 2018/0194453 A1 | 7/2018 | Randall et al. | |
| 2019/0322350 A1 | 10/2019 | Morrell | |

FOREIGN PATENT DOCUMENTS

| | | | | |
|---|---|---|---|---|
| GB | 2535489 | | 8/2016 | |
| GB | 2535489 A | * | 8/2016 | ........... B64C 23/072 |
| GB | 2544812 | | 5/2017 | |
| GB | 2544812 A | * | 5/2017 | ........... B64C 23/072 |

OTHER PUBLICATIONS

Combined Search and Examination Report for GB2115422.4, dated Jul. 6, 2022, 6 pages.

* cited by examiner

*Primary Examiner* — Timothy D Collins
*Assistant Examiner* — Eric Acosta
(74) *Attorney, Agent, or Firm* — Nixon & Vanderhye P.C.

(57) ABSTRACT

A wing assembly for an aircraft is disclosed having a wing and a wing tip device at the tip of the wing, wherein the wing tip device is moveable between a flight configuration and a ground configuration. The wing has a spar extension which extends spanwise away from a distal end of the wing, the spar extension having a first end portion fixed in the wing and a second end portion which, in the flight configuration, is disposed in the wing tip device such that, in the flight configuration, the spar extension transmits flight loads between the wing tip device and flight-load bearing structure in the wing. The wing assembly may have an actuation assembly to move the wing tip device.

16 Claims, 17 Drawing Sheets

MOVEABLE WING TIP ARRANGEMENTS AND METHODS

CROSS RELATED APPLICATION

This application claims priority to United Kingdom Patent Application GB 2115422.4 filed Oct. 27, 2021, the entire contents of which is hereby incorporated by reference.

BACKGROUND OF THE INVENTION

The present invention relates to wing assemblies for aircraft, to wings, movable wing tip devices and actuation assemblies for such wing assemblies, to aircraft comprising such assemblies, wings or devices, and to methods for adjusting the wing span of an aircraft.

There is a trend towards increasingly large passenger aircraft, for which it is desirable to have correspondingly large wing spans. However, the maximum aircraft span is effectively limited by airport operating rules which govern various clearances required when maneuvering around the airport (such as the span and/or ground clearance required for gate entry and safe taxiway usage).

In some suggested designs, aircraft are provided with wing tip devices which may be moved to reduce the span of the aircraft on the ground (compared to when the aircraft is configured for flight). However, there are technical challenges in providing a practical form of moving arrangement. Amongst the issues to be addressed are: the problem of providing a reliable moving mechanism for accommodating the inboard and outboard movement of the wing tip device without impacting unduly on the design of the wing, including aerodynamic leakage; and the problem of providing a compact and lightweight drive to effect the movement of the wing tip device. By way of example, as wing spans continue to increase, the spanwise extent of wing tip devices relative to the inboard wing grows proportionally larger. Aspects of the present invention seek to mitigate or overcome at least some of the above-mentioned problems.

SUMMARY OF THE INVENTION

The inventor has identified that, with the tendency for wing aspect ratios to increase and wing box thicknesses to decrease, further constraints to wing design are emerging regarding, for example, how and where to accommodate i) increasingly large flight loads transmitted between the wing tip device and the inboard wing and/or ii) increasingly large and/or heavy components for folding and unfolding the wing tip device.

According to a first aspect of the invention, there is provided a wing assembly for an aircraft, the wing assembly comprising a wing and a wing tip device at the tip of the wing, wherein the wing tip device is moveable between:
 a flight configuration for use during flight, in which the wing tip device projects from the wing for increasing the span of the aircraft, and
 a ground configuration for use during ground-based operations, in which ground configuration the wing tip device is moved away from the flight configuration for reducing the span of the aircraft,
wherein the wing comprises a spar extension which extends spanwise away from a distal end of the wing, the spar extension having a first end portion fixed in the wing and a second end portion which, in the flight configuration, is disposed in the wing tip device such that, in the flight configuration, the spar extension transmits flight loads between the wing tip device and flight-load bearing structure in the wing,
wherein the wing assembly further comprises an actuation assembly, the actuation assembly being configured to move the wing tip device from the flight configuration to the ground configuration, wherein the movement comprises:
 initiation of a first movement in which the wing tip device is translated in a direction of a vertically extending axis to a position in which the wing tip device is located clear of the extent of the wing in said direction to permit rotational movement of the wing tip device about the vertically extending axis without obstruction by the wing; and
 initiation of a second movement in which the wing tip device is rotated about the vertically extending axis such that the span of the wing assembly is reduced.

By providing such an arrangement, potential problems in facilitating the provision of a suitable arrangement for the moving and supporting the wing tip device can be mitigated. Disposition of the spar extension in the wing tip device in the flight configuration facilitates the provision of a strong and aerodynamically efficient wing assembly by reducing or removing the requirement for bulky components in the wing assembly that protrude outside of the wing outer skin in the flight configuration, even in wing designs with reduced wing box depth. Furthermore, the arrangement facilitates the provision of a wing assembly with a reduced or removed requirement for any portion of the wing tip device to protrude below the wing assembly in the ground configuration. The arrangement further facilitates the provision of a lighter wing tip device, because more of the flight load transmission structure, in the flight load configuration, is provided within the wing tip device by the spar extension, which does not form part of the wing tip device mass requiring movement by the actuation assembly. This arrangement thus also facilitates use of a lower power actuation assembly, reducing the weight and size requirements of the actuation assembly, and in some embodiments can facilitate placement of the actuation assembly in an effective and well supported location for efficient power transfer when moving the wing tip device to and from the ground configuration. The arrangement additionally facilitates the provision of an efficient design for flight load transmission between the wing tip device and the wing, for example by enabling in some embodiments the provision of greater moment arms at the interface between the flight load bearing structures of the wing tip device and the wing. Furthermore, the provision of effective seals for resisting passage of air through an interface region between the wing and the wing tip device is facilitated, to mitigate aerodynamic leakage and performance degradation It will be understood by the ordinarily skilled reader that a spar as used herein refers to a wing spar, that is an elongate spanwise extending major structural member that is specified to carry flight loads and the weight of the wings while on the ground. A spar extension as used herein continues and increases the spanwise extent of a spar while maintaining the load bearing functions of a spar along the length of the extended spar Preferably, the second movement is initiated subsequent to the first movement.

The wing tip device may be a wing tip extension; for example the wing tip device may be a planar tip extension. In other embodiments, the wing tip device may comprise, or consist of, a non-planar device, such as a winglet. The wing tip device may comprise a further wing section having a further movable wing tip device at its distal end. The ordinarily skilled person will be aware of other devices suitable for movably placing at the wing tip. The wing tip device may include, for example, trailing edge moveable devices for control (ailerons) or leading edge devices for stall protection, such as slats or droop nose devices Preferably, the wing tip device defines a cavity to receive the second end portion of the spar extension, the cavity opening through a lower surface of the wing tip device such that the second end portion of the spar extension can pass through the opening to permit the wing tip device to move into and out of the flight configuration. The cavity may be closable in the flight configuration, for example, by a removable plate or hinged door, to facilitate greater aerodynamic performance of the wing assembly by mitigating any discontinuities in the surface of the wing tip device.

Furthermore, in the flight configuration, the lowest extent of the spar extension preferably lies within or level with the lower outer surface of the wing tip device. In some embodiments, it is contemplated that a lower surface of the spar extension could form part of the outer surface of the wing tip device.

In the flight configuration the trailing edge of the wing tip device may be a continuation of the trailing edge of the wing. The leading edge of the wing tip device may be a continuation of the leading edge of the wing, such that there is a smooth transition from the wing to the wing tip device. It will be appreciated that there may be a smooth transition, even where there are changes in sweep or twist at the wing/wing tip device junction. However, there are preferably no discontinuities at the junction between the wing and wing tip device. At least at the root of the wing tip device, and preferably along the length of the wing tip device, the upper and lower surfaces of the wing tip device may be continuations of the upper and lower surfaces of the wing. The span ratio of the wing relative to the wing tip device may be such that the wing comprises at least 70%, 80%, 90%, or more, of the overall span of the aircraft wing. The wing may comprise a wing root fixedly mounted to an aircraft body. In alternative embodiments, the wing may be movably connected to an inboard further wing portion, the latter fixedly mounted to the aircraft body, providing a wing assembly with more than two relatively movable sections.

When the wing tip device is in the ground configuration, the aircraft incorporating the wing, may be unsuitable for flight. For example, the wing tip device may be aerodynamically and/or structurally unsuitable for flight in the ground configuration. The aircraft is preferably configured such that, during flight, the wing tip device is not moveable to the ground configuration. The aircraft may comprise a sensor for sensing when the aircraft is in flight. When the sensor senses that the aircraft is in flight, a control system is preferably arranged to disable the possibility of moving the wing tip device to the ground configuration. In the ground configuration the wing tip device may be held in place. For example the wing tip device may be latched or locked in place to prevent movement back towards the flight configuration.

US 2017/0043864, the contents of which is incorporated herein by reference, describes a movable wing tip device, the wing tip device having a spar beam that is pivotally mounted between i) a distal end thereof and ii) an opposite end thereof which is fixed within the wing tip device, such that the spar beam moves with the wing tip device. A fixed wing tip device having a spar beam is described in US 2012/0112005, the contents of which is incorporated herein by reference. The fixed wing tip device comprises a spar beam which has a first end fixed in the wing tip device and a second distal end in the wing. US 2018/0194453 describes a wing tip device rotatable about an Euler axis of rotation, the wing tip device being separated from a fixed wing along an oblique cut plane passing through upper and lower surfaces of the folding wing.

In preferred embodiments of the wing assembly described below, in the flight configuration, fore and aft directed faces of the spar extension are disposed within the wing tip device adjacent oppositely facing respective aft and fore directed internal faces of the wing tip device.

The wing assembly most preferably comprises a lock arrangement operable to lock the wing tip device to the spar extension in a flight configuration, for flight load transmission between a load bearing structure of the wing tip device and the spar extension, and to unlock the wing tip device from the spar extension to permit movement of the wing tip device into the ground configuration. The lock arrangement may, for example, comprise shear pins movable into and out of receiving openings of the spar extension or the load bearing structure of the wing tip device at locations spaced apart in a direction of a chordwise axis of the wing and/or in a direction of a spanwise axis of the wing, said receiving openings being aligned in the flight configuration of the wing assembly with respective corresponding openings in the other of the spar extension or the load bearing structure of the wing tip device so as to transmit flight load forces through the shear pins between the spar extension and the load bearing structure of the wing tip device. Such arrangements are particularly advantageous in that distances between the locations of the openings, particularly in a spanwise direction, can be selected to provide appropriate moment arms to enable the wing to more efficiently react torque exerted by the wing tip device on the wing during flight, as compared to known arrangements such as vertically spaced hinge lugs and locking lugs that provide a relatively short vertical moment arm, the length of which is restricted by the depth of the wing box available at the interface of the wing and the wing tip device, for example as shown in US 2019/0322350.

The spar extension preferably has at least one wing spar member comprising an integral portion of a respective spar of the wing, the or each wing spar member continuously extending the or each respective spar of the wing away from the distal end of the wing. For example, a main spar and/or other spar of the wing may be manufactured to include the extension at the time of construction of the wing. In an alternative preferable arrangement, the spar extension has at least one wing spar member fixedly mounted within the wing to a respective spar of the wing. Any suitable type of mounting may be used, for example various suitable mounting arrangements are described in US 2012/0112005 in relation to a spar beam of a fixed wing tip device, for example using single or double lap shear joints spaced apart in a spanwise direction of the wing. Each of the respective aforementioned integral and mounted arrangements may be used in the same wing for different respective spars.

The spar extension most preferably comprises respective fore and aft wing spar members. Further wing spar members are also envisioned as being included in the spar extension for some applications.

The wing tip device preferably comprises at least one flight load bearing tip spar member configured to interface with the or each respective wing spar member for transmission of flight loads therebetween.

The actuation assembly preferably comprises a rotary actuator for causing the second movement, the rotary actuator being movable in the direction of the vertical axis with the wing tip device during the first movement. However, many alternative actuation mechanisms suitable for causing the rotary movement are available, including for example some using linear actuators. Advantageously, the provision of lower power actuators is facilitated, because the direction of rotary movement into the ground configuration does not comprise a large component directly opposed to gravity. Preferably, the actuation assembly comprises a linear actuator for causing the first movement. The amount of movement can, for example, be selected to achieve an aggregate aircraft wing span that satisfies airport operating rules, or to facilitate access to and/or visual inspection of internal components of the wing assembly. While the aggregate aircraft wing span with the wing tip device in the ground configuration includes the spar extension, the various advantages of at least some aspects of the invention mentioned above facilitate efficient wing assembly designs having longer wing tip devices that can be supported by shorter inboard wings, thereby facilitating shorter aggregate aircraft wingspans for ground operations, even taking into account the spar extension.

Most preferably, the actuation assembly is connected to and acts, directly or indirectly, on the spar extension for driving the wing tip device. The location of the spar extension within the wing tip device provides a wide choice of locations for placing and supporting an actuator within the wing tip device to obtain mechanical advantage when moving the wing tip device. The or each actuator may take any of a wide variety of forms and may for example be any suitable kind of gas, hydraulic or electric drive. Many alternative implementations of the actuation assembly will be apparent to the ordinarily skilled person. The actuation assembly may be at least partly located in the wing.

In the flight configuration, the lowest extent of the actuation assembly preferably lies above or level with the lower outer surface of the wing assembly. The provision of this feature is facilitated by the lighter wing tip requiring relatively small actuators more readily accommodated in the wing box, and the support provided by the spar extension within the wing tip for the actuators to act on locally, without the requirement for complex or bulky support and/or drive chain mechanisms.

It is preferable that the wing assembly comprises a compression seal for resisting passage of air through an interface region between the wing and the wing tip device, the seal in the flight configuration being disposed between i) a first seal support surface provided by the wing and facing in a direction of said first movement, and ii) a second seal support surface provided by the wing tip device and facing the first seal support surface. In this manner, upward and downward translational movements of the wing tip device facilitate decompression and compression of the seal. This feature facilitates the provision of seal support surfaces that face in the direction of seal engagement or disengagement. The seal support surfaces may be arranged normal, or close to normal, to the direction of seal engagement or disengagement along a major portion of the extent of the seal across the wing assembly in a chordwise direction. The seal preferably comprises a continuous seal member extending over the first seal support surface and/or the second support surface. Multiple seal support surfaces and/or seals may be provided in accordance with design requirements. The compression seal described above facilitates the provision of a wing assembly having lower seal breakout forces, and/or a reduced likelihood of damage to the seal and wing assembly components, for example damage caused by drag during engagement and disengagement, and/or reduced aerodynamic leakage and reduced consequential performance degradation.

According to a second aspect of the invention, there is provided a wing assembly for an aircraft, the wing assembly comprising a wing and a wing tip device at the tip of the wing, wherein the wing tip device is moveable between:
    a flight configuration for use during flight, in which the wing tip device projects from the wing for increasing the span of the aircraft, and
    a ground configuration for use during ground-based operations, in which ground configuration the wing tip device is moved away from the flight configuration,
    wherein the wing comprises a spar extension which extends spanwise away from a distal end of the wing, the spar extension having a first end portion fixed in the wing and a second end portion which, in the flight configuration, is disposed in the wing tip device such that, in the flight configuration, the spar extension transmits flight loads between the wing tip device and flight-load bearing structure in the wing.

The wing assembly preferably comprises an actuation assembly, the actuation assembly being configured to move the wing tip device from the flight configuration to the ground configuration, wherein the actuation assembly comprises: a linear actuator for causing a first movement in which the wing tip device is translated in a direction of a vertically extending axis to a position in which the wing tip device is located clear of the extent of the wing in said direction to permit rotational movement of the wing tip device about the vertically extending axis without obstruction by the wing; and a rotary actuator for causing a second movement in which the wing tip device is rotated about the vertically extending axis such that the span of the wing assembly is reduced.

According to a third aspect of the invention, there is provided a wing comprising a spar extension which extends spanwise away from a distal end of the wing, the spar extension having a first end portion fixed in the wing and a second end portion which is configured to be disposed in a movable wing tip device such that, in the flight configuration, the spar extension transmits flight loads between the wing tip device and flight-load bearing structure in the wing. A wing of this type can facilitate removal and replacement of wing type devices on the wing, for example by maintenance staff, even where no actuation mechanism is included in the wing assembly for moving the wing tip device between configurations. Preferably, the spar extension includes at least one wing spar member comprising a portion of a respective spar of the wing, the or each wing spar member comprising an extension of the or each respective spar of the wing away from the distal end of the wing. The wing is preferably configured to support an actuation assembly to move the wing tip device from the flight configuration to the ground configuration.

According to a fourth aspect of the invention, there is provided a wing tip device movable relative to a wing, the wing tip device configured to receive in the wing tip device an end portion of a spar extension of the wing such that, in the flight configuration, the spar extension transmits flight loads between the wing tip device and flight-load bearing structure in the wing.

According to a fifth aspect of the invention, there is provided an actuation assembly for a wing assembly, the actuation assembly comprising a first actuator for causing a first movement in which the wing tip device is translated in a direction of a vertically extending axis to a position in which the wing tip device is located clear of the extent of the wing in said direction to permit rotational movement of the wing tip device about the vertically extending axis without obstruction by the wing; and a second actuator for causing a second movement in which the wing tip device is rotated about the vertically extending axis for reducing the span of the wing assembly.

According to a sixth aspect of the invention, there is provided an aircraft comprising a wing assembly, a wing, a wing tip device or an actuation assembly as claimed in any preceding claim.

According to a seventh aspect of the invention, there is provided a method of adjusting the wing span of an aircraft for ground operations, the method comprising initiation of a first movement in which the wing tip device is translated, in a direction of an up-down axis, to a position in which the wing tip device is located clear of the wing in said direction, to permit rotational movement relative to the wing without obstruction by the wing; and initiation of a second movement in which the wing tip device is rotated about an up-down axis such that the span of the wing assembly is reduced. The initiation of the second movement may be subsequent to the initiation of the first movement. The first movement is preferably upwards. The second movement preferably causes the wing tip device to move to a position at least partially directly above the wing.

According to a further aspect of the invention, there is provided an aircraft comprising a wing and a wing tip device at the tip of the wing, wherein the wing tip device is moveable between:
 a flight configuration for use during flight, in which the wing tip device projects from the wing increasing the span of the aircraft, and
 a ground configuration for use during ground-based operations, in which ground configuration the wing tip device is pivoted about a hinge axis from the flight configuration such that the span of the aircraft is reduced,
wherein the wing comprises a spar extension which has a first end fixed in the wing and a second end which, in the flight configuration, is disposed in the wing tip device, and wherein one or more actuators are provided for pivoting the wing tip device between the flight configuration and the ground configuration, the one or more actuators acting on the spar extension.

The invention may be applied to a military aircraft and/or to a cargo aircraft, for example, but is especially advantageous in the case of a passenger aircraft. The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

It will of course be appreciated that features described in relation to one aspect of the present invention may be incorporated into other aspects of the present invention. For example, features described in relation to the aircraft of the first aspect of the invention may be incorporated into the aircraft of the second aspect of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
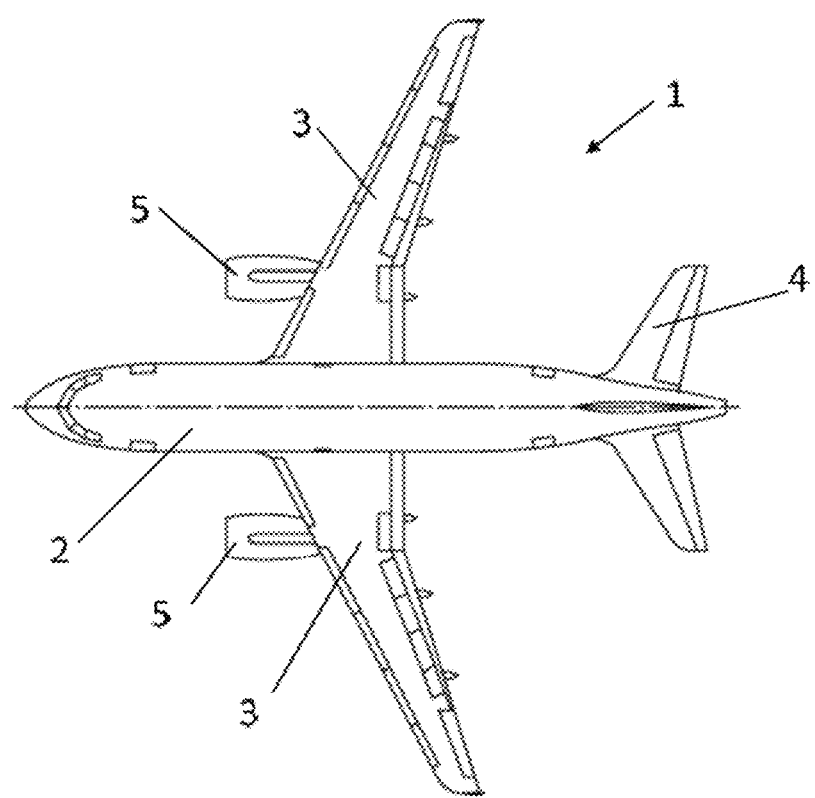
FIG. 1 is a top view of a passenger aircraft to which a wing tip device may be fitted.

FIG. 1 shows a passenger aircraft 1 having a fuselage 2, wings 3, a tailplane 4 and engines 5. The aircraft shown in FIG. 1 is a simply one example of an aircraft to which the invention may be applied by fitting wing tips. The wing tips may be retro-fitted or fitted during manufacture of the aircraft.

Figure 2:
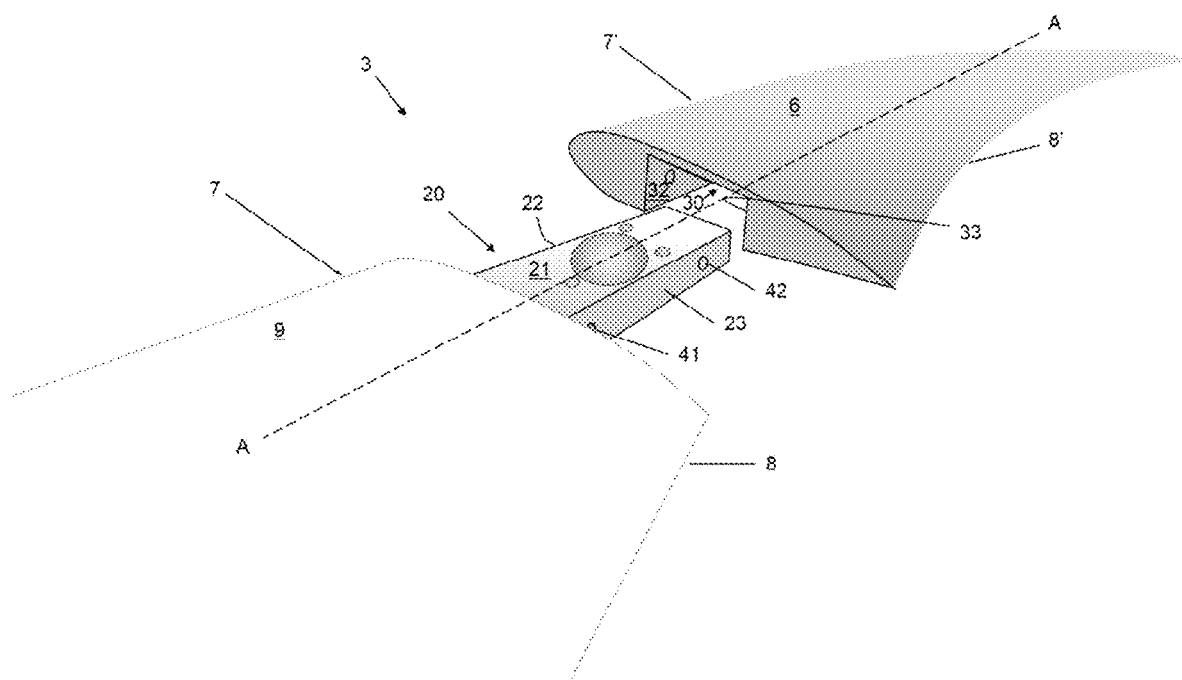
FIG. 2 is a perspective view of portions of a wing assembly.

FIG. 2 is a schematic view, from above and in a spanwise and outboard direction, of portions of a wing assembly that may for example be one of the wing assemblies 3 shown in FIG. 1. The wing assembly 3 has a wing 9 and a wing tip device 6 for mounting at the tip of the wing 9. FIG. 2 shows wing tip device 6 unmounted from the wing, to better illustrate structural features of the wing assembly 3. The wing 9 is fixed at one end thereof (not shown in FIG. 2) to the fuselage of an aircraft. In alternative embodiments (not shown), the wing may be movably mounted to the tip of a further wing.

The wing tip device 6 is moveable between a flight configuration and a ground configuration, as described in further detail below. In the flight configuration, the leading and trailing edges 7', 8' of the wing tip device 6 are continuations of the leading and trailing edges 7, 8 of the wing 9. Furthermore, the upper and lower surfaces of the wing tip device 6 are continuations of the upper and lower surfaces of the wing 9. Thus, there is a smooth transition from the wing 9 to the wing tip device 6.

The wing tip device 6 is placed in the flight configuration for flight. In the flight configuration, the wing tip device 6 thus increases the span of the aircraft (thereby providing beneficial aerodynamic effects, for example, reducing the component of induced drag and increasing the lift). In principle, it would be desirable to maintain this large span at all times and simply have a large fixed wing. However, the maximum aircraft span is effectively limited by airport operating rules which govern various clearances required when maneuvering around the airport (such as the span and/or ground clearance required for gate entry and safe taxiway usage, and access to hangars for maintenance). Thus, in embodiments of the invention described below the wing tip device 6 is moveable to a ground configuration for use when on the ground. In the ground configuration the wing tip device 6 is displaced inwardly, from the above-mentioned flight configuration.

Changing the span of an aircraft is known per se. For example, in some suggested designs, military aircraft are provided with wings which may be folded upwardly to reduce the span of the aircraft on the ground (compared to when the aircraft is configured for flight). However, a disadvantage with such arrangements is that they tend to require heavy actuators and/or locking mechanisms to deploy the wing and to securely hold it in the flight configuration.

Referring to FIG. 2, the wing 9 comprises a spar extension 20 which extends spanwise away from a distal end of the wing 9, that is, away from a region of the wing 9 where the upper and lower surfaces of the wing 9 end. The spar extension 20 comprises a first end portion (24, shown in FIGS. 3a-e and 6) fixed in the wing 9 and a second end portion 21 which, in the flight configuration, is disposed in the wing tip device 6. As shown in FIG. 2, the wing tip device 6 defines a cavity shown generally as 30. The cavity 30 opens through a lower surface 31 of the wing tip device 6. The second end portion 21 of the spar extension 20 can move through the opening to permit the wing tip device 6 to move into and out of the flight configuration. In the flight configuration, fore and aft directed faces 22, 23 of the second end portion 21 of the spar extension 20 are disposed within the wing tip device 6 adjacent oppositely facing respective aft and fore directed internal faces 32, 33 of the wing tip device 6 partially defining the cavity 30.

In some embodiments (not shown), the opening of the cavity 30 through the lower surface 31 of the wing tip device 6 is closable in the flight configuration, for example, by a removable plate or hinged door (not shown), to facilitate greater aerodynamic performance of the wing assembly 3 by mitigating any discontinuities in the surface of the wing tip device 6. In alternative embodiments, in the flight configuration, the lowest extent of the spar extension 20 lies level with the lower outer surface 31 of the wing tip device 6, such that a lower surface of the spar extension 20 forms part of the lower outer surface 31 of the wing assembly 3 and is effectively contiguous with the lower outer surface 31 of the wing tip device 6.

Figure 3A:
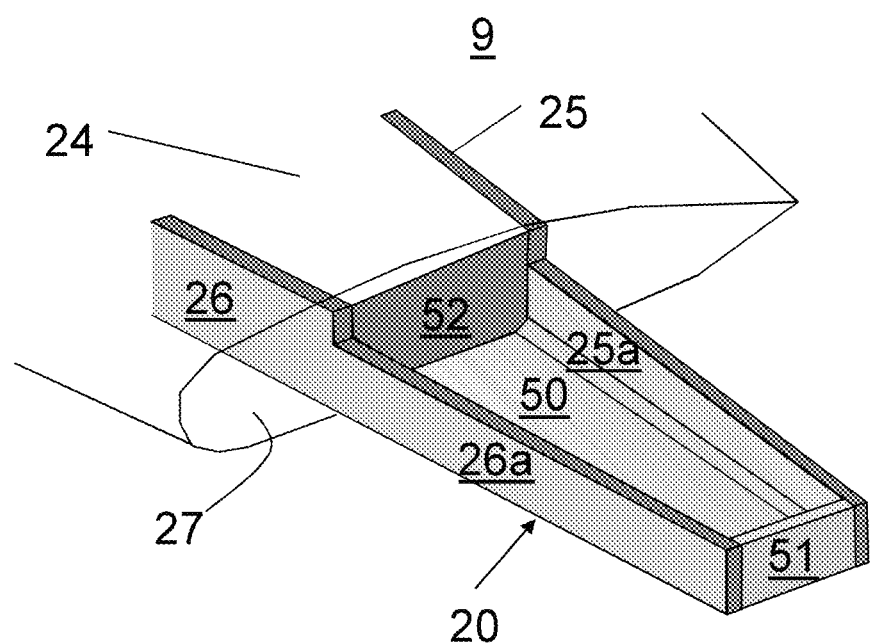
FIGS. 3a to 3e are views showing alternative structural arrangements for a spar extension.
Figure 5:
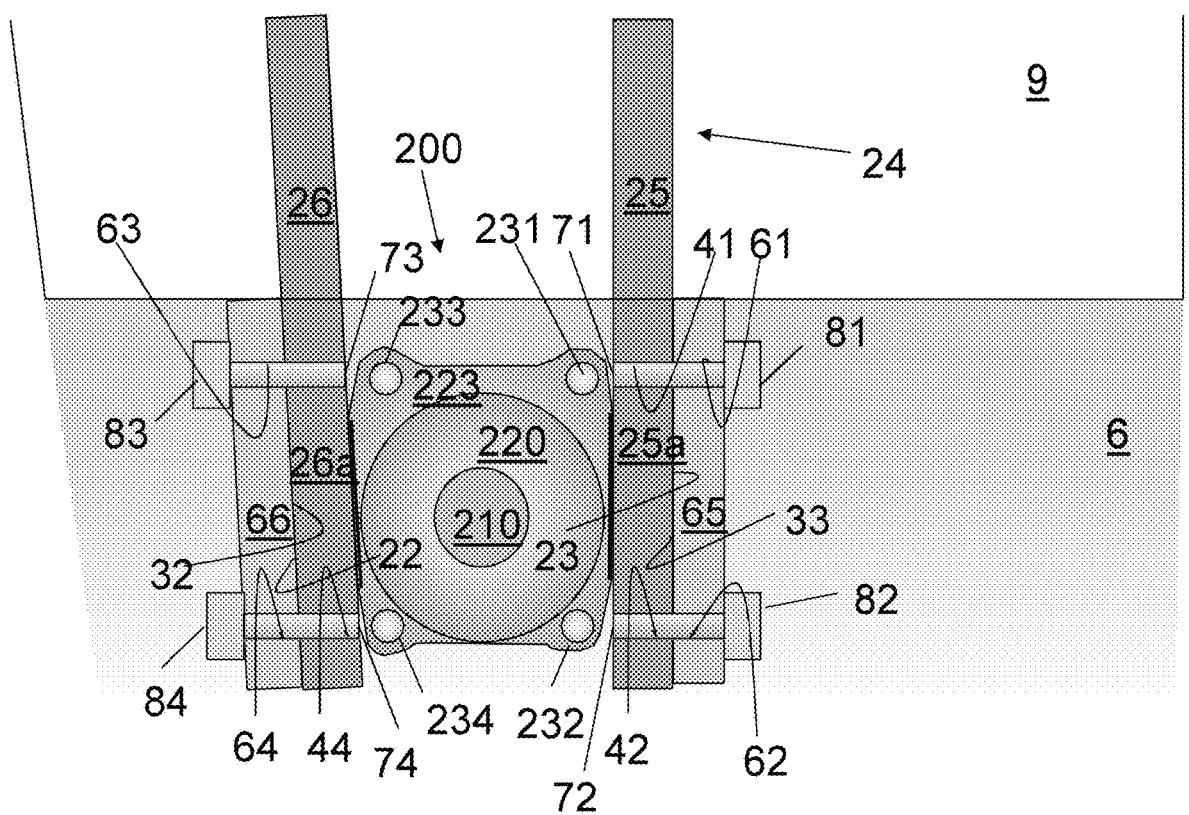
FIG. 5 is a sectional plan view showing portions of a wing spar extension, a wing tip device, and an actuation assembly.

The spar extension 20 is shown in greater detail in FIGS. 3a and 5. The spar extension 20 comprises a rear spar member 25a continuously extending a main, or rear, spar 25 of the wing 9 away from a distal end of the wing 9. The rear, or aft, wing spar member 25a is an integral portion of the rear spar 25, and the rear spar 25 including the integrally extending portion 25a is built into the wing 9 at the time of construction of the wing 9. The spar extension 20 further comprises a front spar member 26a continuously extending a front spar 26 of the wing 9 away from the distal end of the wing 9. The front, or fore, wing spar member 26a is an integral portion of the front spar 26, and the front spar 26 including the integrally extending portion 26a is built into the wing 9 at the time of construction of the wing 9. The rear spar 25 and front spar 26 form the first end portion 24 of the spar extension 20, fixed in the wing 9. The rear spar member 25a and the front spar member 26a form the second end portion 21 of the spar extension 20. In alternative embodiments (not shown) either or both of the rear spar member 25a or the front spar member 26a are respectively fixedly mounted within the wing 9 to a respective wing spar 25, 26. By way of example only, suitable mounting structures are described in US 2012/0112005, for example using single or double lap shear joints spaced apart in a spanwise direction.

The rear face 23 of the second end portion 21 of the spar extension 20 comprises openings 41, 42 at locations spaced apart in a direction of a spanwise axis A-A of the wing 9. The front face 22 of the second end portion 21 of the spar extension 20 comprises openings 42, 43 therein at locations spaced apart in a direction of the spanwise axis A-A. As best shown in FIGS. 2 and 5, the openings 41 and 42 comprise through openings, for example through bores, in the rear spar member 25a, and the openings 43, 44 comprise through openings, for example through bores, in the front spar member 26a. Openings 41 and 42 are spaced apart spanwise along the rear spar member 25a, and openings 43 and 44 are spaced apart spanwise along the front spar member 26a. Openings 41 and 43 are spaced apart chordwise on opposite faces of the spar extension 20, with their axes in mutual alignment. Openings 42 and 44 are spaced apart chordwise on opposite faces of the spar extension 20, with their axes in mutual alignment.

FIG. 3a illustrates the spar extension 20 in further detail, and FIGS. 3b to 3e schematically illustrate various alternative structural arrangements which may be used to further enhance the structural integrity of the spar extension 20, to better react flight load forces produced at the wing tip device 6. In the spar extension 20 of FIG. 3a, additional rigid reinforcing members extend transversely between the front and rear spar members 26a, 25a, in the form of i) a bottom member forming a base of the spar extension 20, and ii) respective vertically oriented walls, or ribs, 51, 52 at the outboard and inboard ends of the spar extension 20. The bottom member 50 can conveniently be provided by a lower cover, or skin, of the wing 9.

Figure 3B:
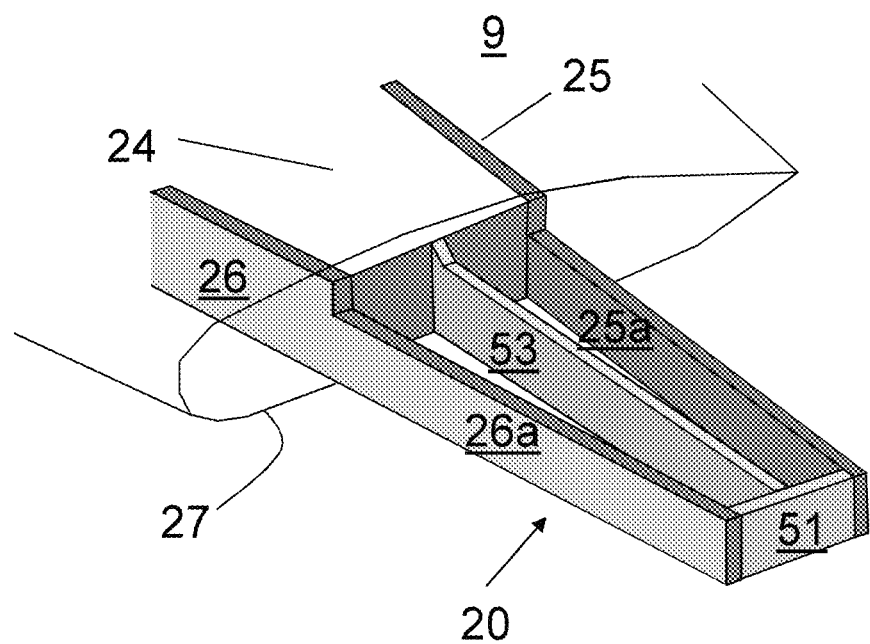

The embodiment of FIG. 3b includes a further vertically oriented wall 53 extending spanwise between the end walls 51, 52, with or without the aforementioned bottom member 50. The wall 53 can in some embodiments be an extension or continuation of a further wing spar (not shown) fixed in the wing 9.

Figure 3C:
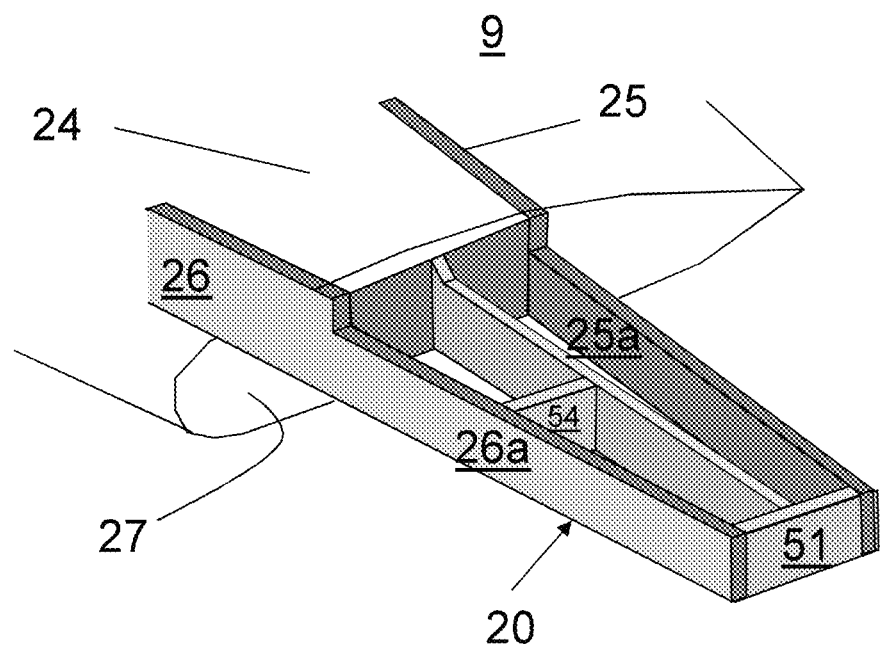

FIG. 3c illustrates an alternative embodiment in which the arrangement of FIG. 3b is further supported by a vertically oriented wall 54, providing an intercostal mini rib extending transversely between the front spar member 26a and the spanwise extending central wall 53.

Figure 3D:
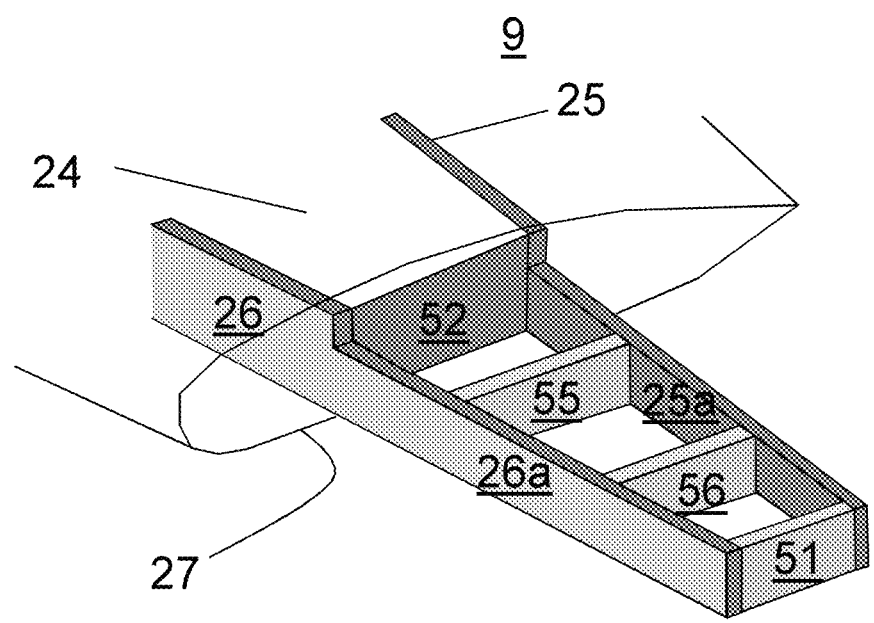

FIG. 3d shows an embodiment in which the front and rear spar members 26a, 25a are interconnected by four transversely extending walls, or ribs, formed by two intermediate ribs 55, 56 in addition to the previously described outboard and inboard end walls 51, 52. Any suitable number of ribs can be provided.

Figure 3E:
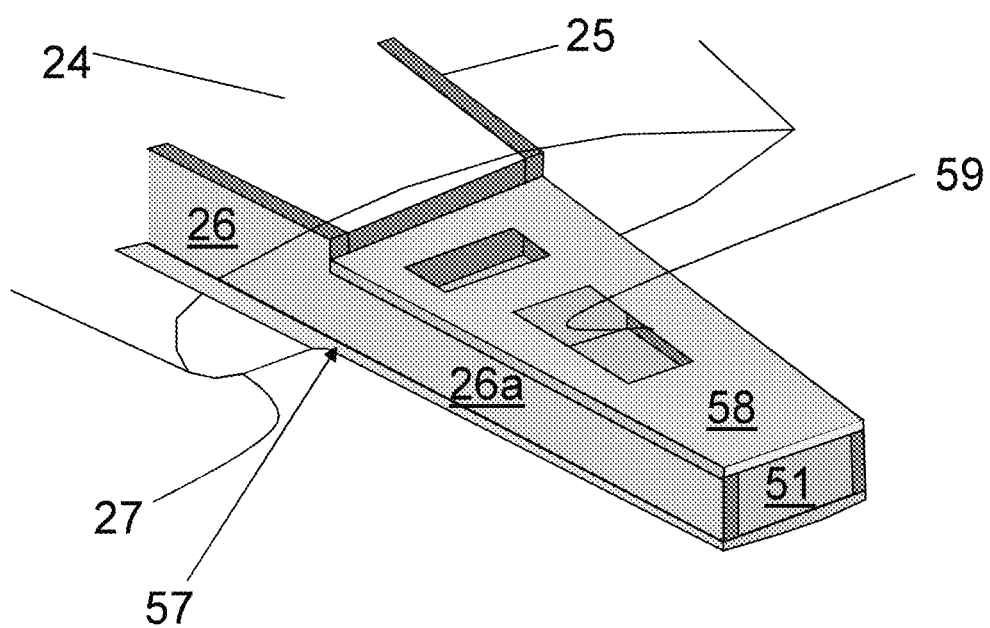
Figure 4:
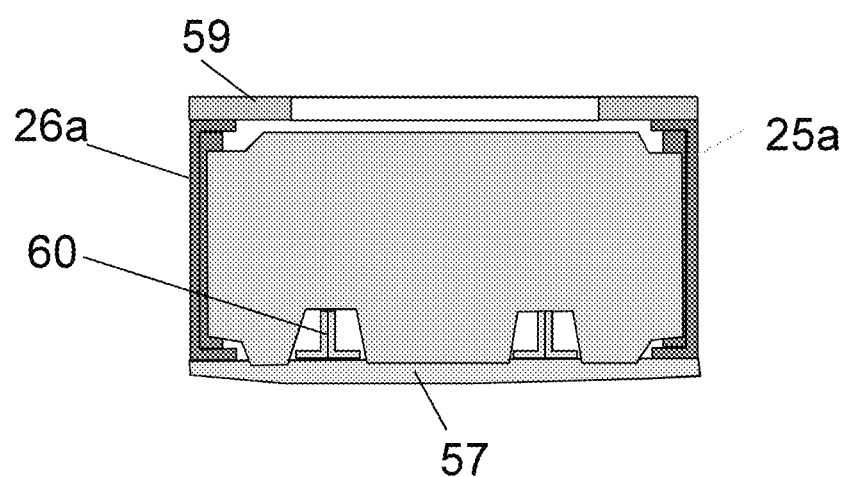
FIG. 4 is a cross-sectional view of the spar extension of FIG. 3e.

FIG. 3e shows a lower cover, or skin, 57 of the wing 9 continuously extending beneath the second portion 21 of the spar extension 20, to more effectively transfer flight loads created at the wing tip device 6 into the flight load bearing structure of the wing 9. A rigid top member 58 extends between the top edges of the front and rear spar members 26a, 25a, to further improve torsional rigidity of the spar extension 20. Systems access holes, such as opening 59, can be provided as required for example to accommodate actuators and other system components. FIG. 4 is a cross-sectional view of the spar extension shown in FIG. 3e, illustrating cutaway portions along a bottom edge of a wall or walls to enable stringers 57 to continue from the wing 9 to reach into the spar extension 20, further supporting the lower cover 57 and the whole spar extension 20. The lower cover 57 and top member 58 shown in FIG. 3e can be employed with any of the embodiments of FIGS. 3a to 3d.

Referring to FIG. 5, the wing tip device 6 comprises a rear flight load bearing spar member 65 and a front flight load bearing spar member 66. An inwardly facing side of the rear wing tip spar member 65 provides the fore directed, or front facing, face 33 the wing tip cavity 30, and is provided with two transversely extending through openings 61, 62 spaced along the wing tip spar member 65 in the spanwise direction. An opposite inwardly facing side of the front wing tip spar member 66 provides the aft directed, or rear facing, face 32 of the wing tip cavity 30, and is provided with two transversely extending through openings 63, 64 spaced along the wing tip spar member 66 in a spanwise direction. In the flight configuration, as shown in FIG. 5, the second end portion 21 of the spar extension 20 is disposed in the cavity 30 within wing tip device 6 such that the rear and front wing tip spar members 65, 66 interface respectively with rear and front wing spar members 25a, 26a for transmission of flight loads therebetween, and the openings 61, 62 and 63, 64 of the wing tip spar members 65, 66 align at the interface with respective openings 41, 42 and 43, 44 of the wing spar members 25a, 26a.

In the arrangement shown in FIG. 5, the spar members 25a, 26a of the spar extension 20 are disposed laterally inwardly of the wing tip spar members 65, 66, such that inwardly directed faces 32, 33 of the front and rear wing tip spar members 66, 65 oppose outwardly directed faces 22, 23 of the wing spar members 26a, 25a. In alternative embodiments (not shown), the wing tip device 6 could be provided with wing tip spar members that, in the flight configuration, are disposed between the wing spar members 25a, 26a, or are alternately disposed, one laterally between and one laterally outside of the wing spar members 25a, 26a of the spar extension 20.

The wing assembly 3 comprises a lock arrangement, as best shown in FIG. 5, which shows the wing tip device 6 locked to the spar extension 20 in the flight configuration. The lock arrangement comprises shear pins 71, 72, 73, 74 and respective actuators 81, 82, 83, 84 for actuating the shear pins so as to move the shear pins axially in and out of the openings 41, 42, 43, 44, of the spar extension 20. In the flight configuration, it will be seen that the shear pins 71, 72, 73, 74 interconnect the spar extension 20 and the wing tip device 6 so as to transmit flight load forces through the shear pins between the load bearing structure of the wing tip device 6 and the spar extension 20. In designing the wing assembly 3, distances between the locations of the shear pins in a spanwise direction can be selected to provide appropriately large moment arms to enable the wing to efficiently react torque exerted by the wing tip device 6 on the wing 9 about a chordwise axis during flight. The chordwise spacing between the respective interfaces of the wing tip device faces 32, 33 and spar extension faces 22, 23 can also be a design consideration, as it determines the chordwise spacing between the points at which the shear pins transmit force. This chordwise spacing can be designed to provide a sufficiently large chordwise moment arm and to thereby facilitate effective reaction of torque exerted by the wing tip device 6 on the wing 9 about a spanwise axis during flight. The lock actuators 81, 82, 83, 84 may take any of a wide variety of forms and may for example be any suitable kind of gas, hydraulic or electric drive.

Figure 6A:
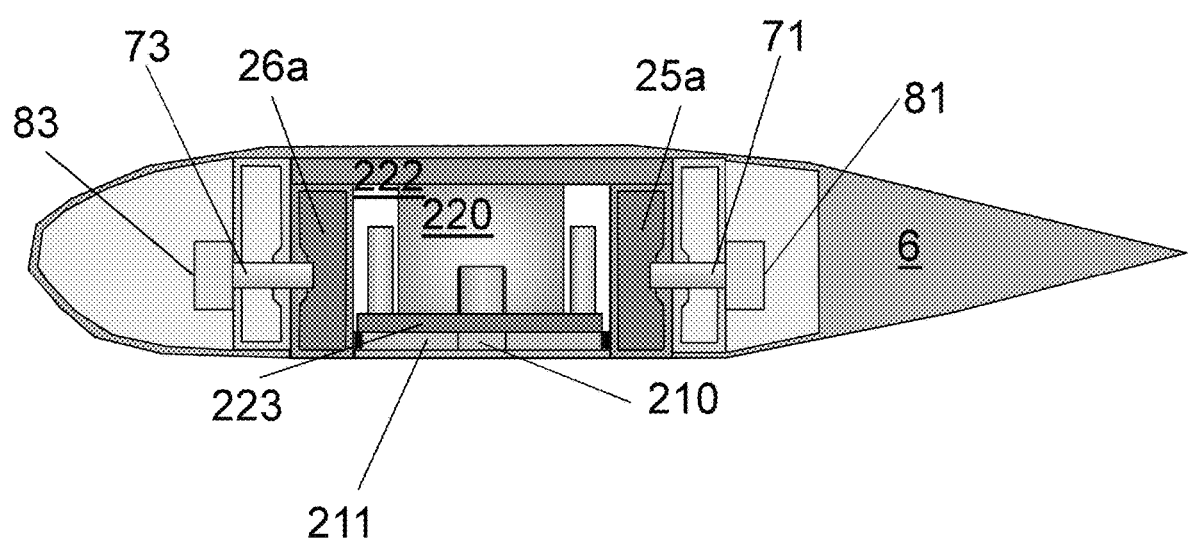
FIGS. 6a to 6g are transverse cross-sectional views showing stages of actuation of the wing assembly.

FIGS. 5 and 6a show an actuation assembly 200 disposed within and supported by the spar extension 20 of the wing assembly 3. The actuation assembly 200 comprises a first actuator 210 and a second actuator 220. The first actuator 210 is operable to cause a first movement, described in further detail below, in which the wing tip device 6 is translated in a direction of a vertically extending axis B-B to a position in which the wing tip device 6 is located clear of the extent of the wing 9 along the axis, that is, sufficiently clear of any obstructions on the wing 9 to permit rotational movement of the wing tip device 6 about the axis. The first actuator 210 is a telescopic multi-stage linear actuator and may for example be any suitable kind of gas, hydraulic or electric drive. Many alternative implementations of the first actuator will be apparent to the ordinarily skilled person, including for example use of a rotary actuator and/or mechanical linkages to obtain the translational movement.

The first actuator 210 is fixed relative to a bottom portion of the spar extension 20. The bottom portion in this example is provided by the bottom member 50 described above with reference to FIG. 3a.

The second actuator 220 is operable to cause a second movement in which the wing tip device 6 is rotated about the vertically extending axis B-B for reducing the span of the wing assembly 3. The second actuator 220 is movable by the first actuator 210 in the direction of the vertical axis B-B together with the wing tip device 6 during the first movement. The second actuator 220 may be a rotary actuator, or any other type of actuator arranged to provide rotary movement. In the example shown in FIGS. 5 and 6a, the first actuator 210 engages with a lower portion of the second actuator 220, and is located centrally of the second actuator 220. The second actuator 220 comprises upper and lower transversely extending flanges 222, 223.

The actuation assembly 200 further includes a movable platform 211 that extends transversely outwards from the first actuator 210 so that outwardly facing sides of the platform 211 slidingly engage with the inner faces of the wing spar members 25a, 26a. The platform 211 is movable by the first actuator 210 upwardly and downwardly in the direction of the vertical axis B-B. An upwardly directed face of the platform 211 engages a downwardly directed lower face the lower flange 223 of the second actuator 220. The actuation assembly 200 further includes a plurality of vertically extending rigid guide members 231, 232, 233, 234, in the form of four guide pins each fixed at a lower end thereof to an upwardly directed upper face of the lower flange 223 of the second actuator 220. The lower flange 223 of the second actuator 220 comprises four through openings that respectively receive a respective one of the four guide members 231, 232, 233, 234. The actuation assembly 200 is configured such that the lower flange 223 is slidably mounted on the guide members 231, 232, 233, 234 for movement of the flange 223 relative to the guide members 231, 232, 233, 234 along the axis B-B.

Movement of the wing tip device 6 from the flight configuration to the ground configuration will now be described. FIGS. 5 and 6a show engagement of the wing spar members 25a, 26a and the wing tip spars 65, 66 in the flight configuration. Shear pins 71, 72, 73, 74 are engaged in respective openings 41, 42, 43, 44, in the spar extension 20, thereby locking the wing tip device 6 securely to the wing 9 for transmission of flight loads therebetween. In this connection, the actuators 210, 220 will have been released, or backed off, after lowering the wing tip device 6 into the flight configuration, to avoid flight loads being reacted through the actuators. The shear pins 71, 72, 73, 74 are locked in the engaged position by the locking actuators 81, 82, 83, 84 and/or by an additional flight lock mechanism (not shown).

Figure 6B:
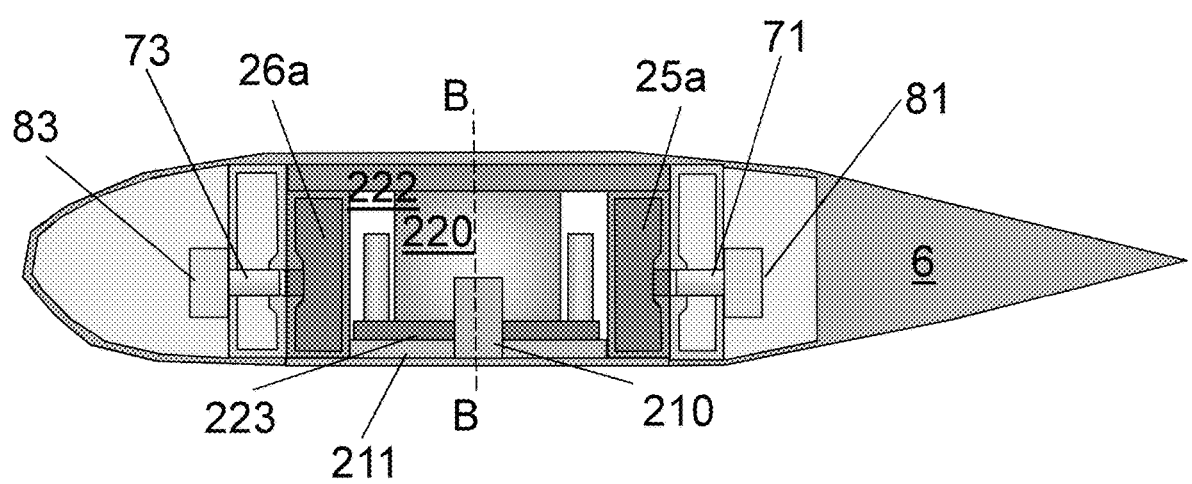

Prior to initiating movement of the wing tip device 6, the lock actuators 81, 82, 83, 84 unlock the wing tip device 6 by driving the shear pins 71, 72, 73, 74 outwardly of the openings 41, 42, 43, 44 in the wing spar members 25a, 26a, into the configuration shown in FIG. 6b.

Figure 6C:
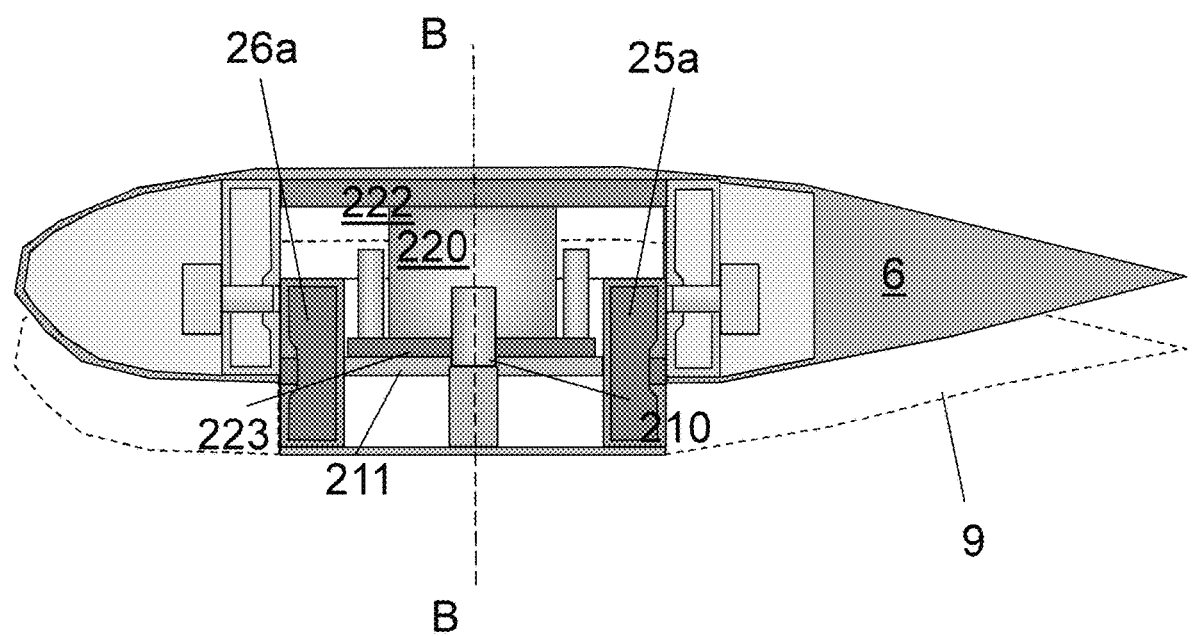
Figure 6D:
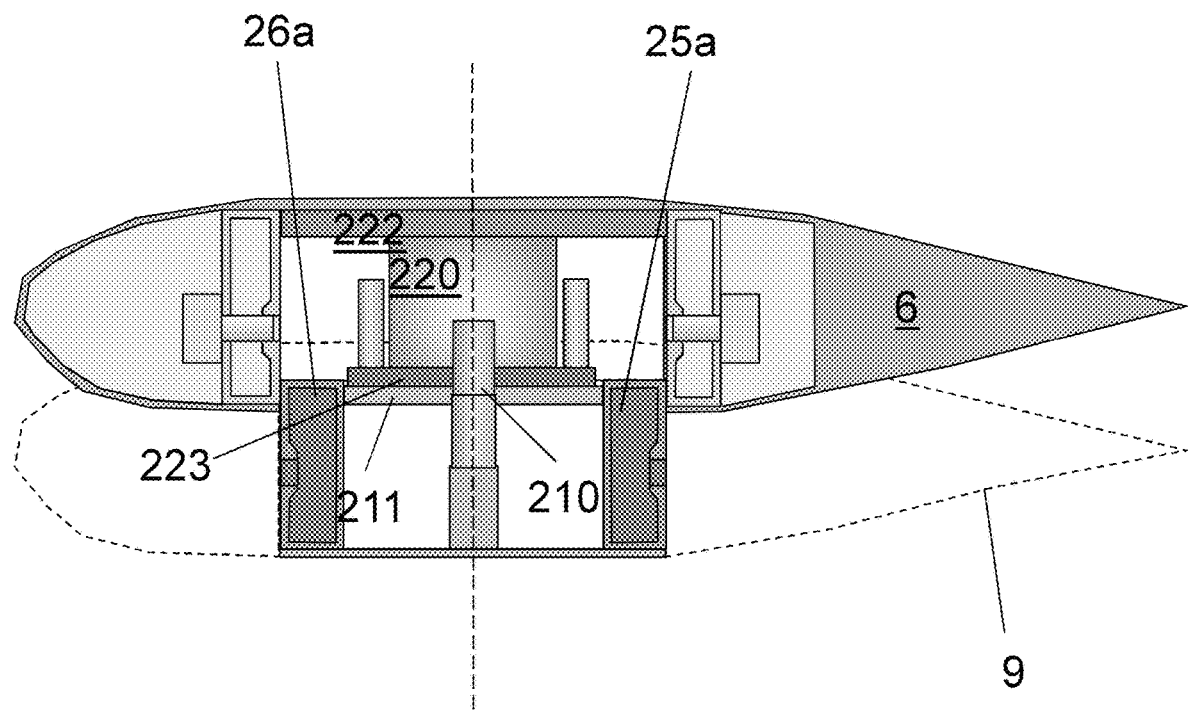
Figure 6E:
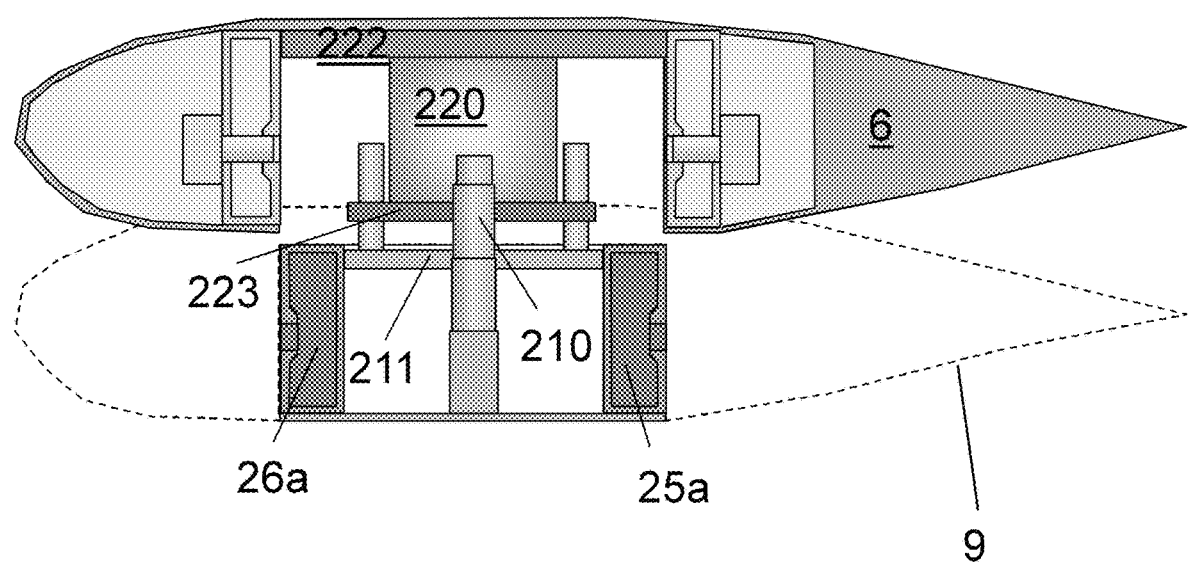
Figure 6F:
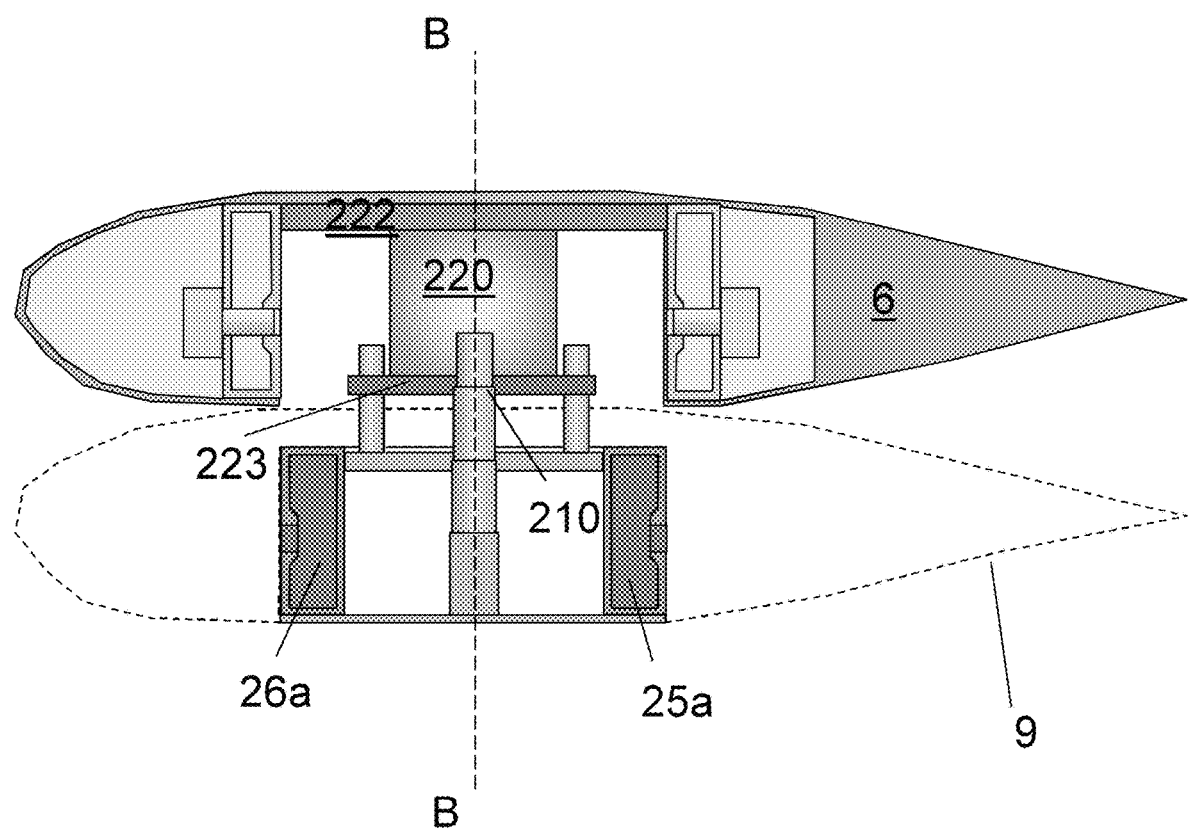
Figure 6G:
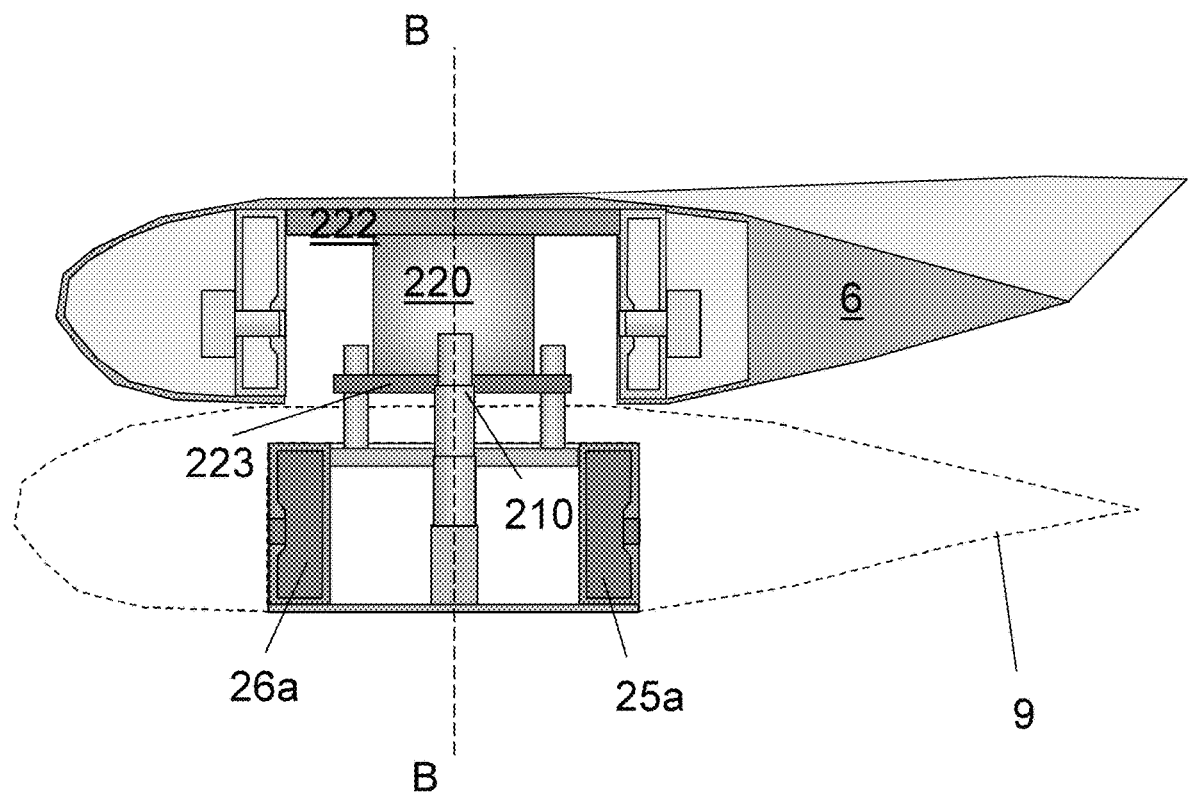

Next, the first actuator 210 is extended to a first actuation stage as shown in FIG. 6c, raising the platform 211 in sliding engagement with the rear and front wing spars 25a, 26a. The platform 211 engages with the lower flange 223 to drive the second actuator 220 upwardly. The upper flange 222 of the second actuator 220 engages with a downwardly facing surface of the wing tip device 6, for example an inner surface of the upper cover of the wing tip device 6, thereby in turn driving an upward movement of the wing tip device 6 as shown in FIG. 6c. The first actuator 210 further extends to a second actuation stage as shown in FIG. 6d, whereby the wing tip device 6 continues its upward movement, and the platform 211 reaches the upper limits of the rear and front wing spar members 25a, 26a. In a third actuation stage, the first actuator 210 stops driving the platform 211, and drives the second actuator 220 further upwards with the lower flange 223 in sliding engagement with the guide members 231, 232, 233, 234, thereby further raising the wing tip device 6 as shown in FIG. 6e. In a fourth actuation stage, the first actuator 210 continues to drive the second actuator 220 upwards and into the vertical position as shown in FIG. 6f, in which the wing tip device 6 is vertically higher than the cross-sectional profile of the wing 9, such that the wing tip device 6 is clear of the profile of the wing 9, including any devices located on the wing 9, for subsequent unobstructed rotation relative to the wing 9. In this position, the first actuator 210 is locked, and the second actuator 220 is activated to rotate the wing tip device 6 about the vertical axis B-B until a desired ground configuration is obtained, as shown in FIG. 6g. In some embodiments, an additional locking mechanism (not shown) is provided, for securing and supporting the wing tip device 6 in the ground configuration, to reduce or remove from the actuator loads experienced by the wing tip device 6 in the ground configuration. To move back to the flight configuration, any additional locking mechanism is released, and the movements above are reversed to bring the wing tip device 6 to the flight configuration, in which the shear pins 71, 72, 73, 74 are reengaged into the locked condition shown in FIG. 5.

The embodiment described above with reference to FIGS. 6a to 6e employs a first vertical stage of movement prior to subsequent unobstructed rotation. One advantage of this embodiment is that the design and/or placement of movable devices near the end of the wing 9, for example ailerons or slats, need not be affected as compared to alternative designs of the wing 9 and wing tip device 6 having obliquely oriented end faces.

In the ground configuration, the wing tip device 6 may lie wholly or partially directly above the wing 9. This facilitates a reduction in the potential for ground based objects to impact on and damage the wing tip device 6 in the ground configuration, especially in the case of full stowage above the wing 9.

In some alternative embodiments (not shown) in accordance with the present invention, the second movement is initiated before the first movement has ended. For example, respective mutually opposite end regions of the wing 9 and the wing tip device 6 may be obliquely inclined, to enable unobstructed overlapping first and second movements.

Figure 7:
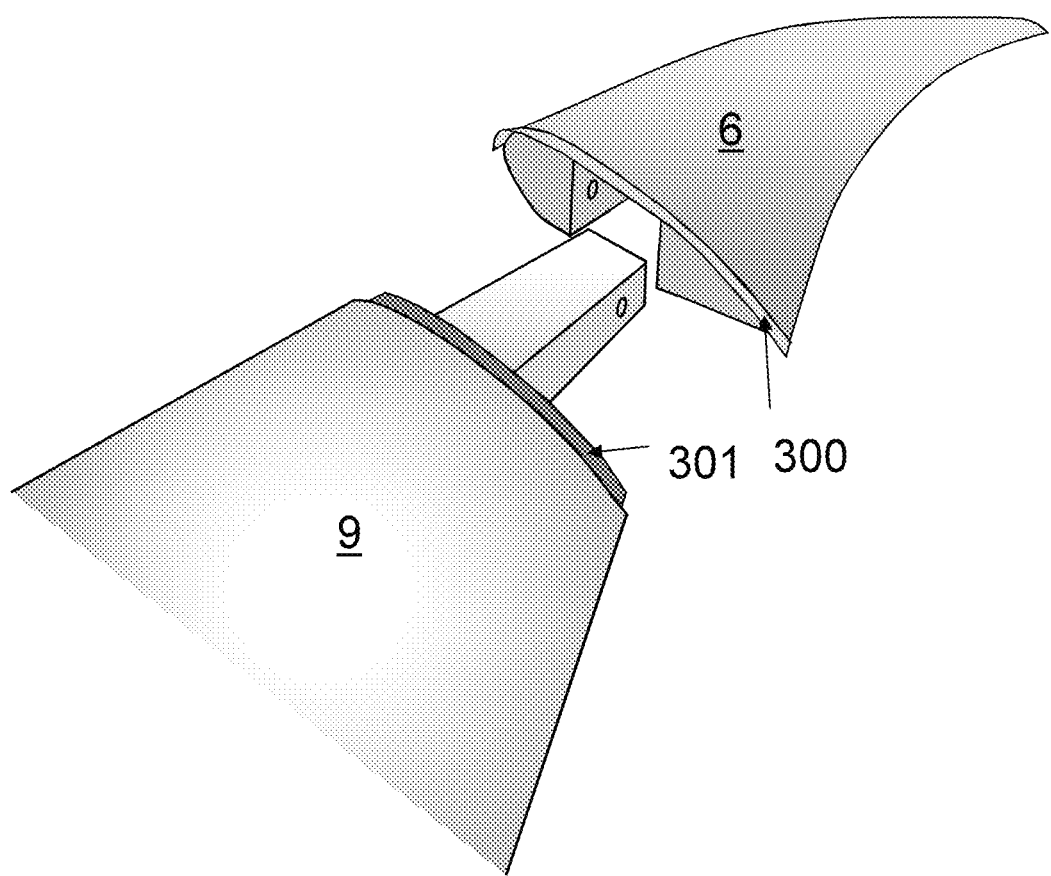
FIG. 7 is a perspective view of portions of a wing assembly, showing details of a sealing arrangement between a wing and a wing tip of the wing assembly.

Referring now to FIG. 7, the wing assembly further comprises a compression seal for resisting passage of air through an interface region between the wing 9 and the wing tip device 6. A first seal support 301 having an upwardly facing surface extends outwardly spanwise from a top surface of the wing 9, and for example comprises an extension of the top cover, or skin, of the wing 9. A second seal support 300 having a downwardly facing surface extends inwardly spanwise from a top surface of the wing tip device 6, and for example comprises an extension of the top cover, or skin, of the wing tip device 6. A compressible seal member (not shown) is disposed along the upwardly facing surface of the first seal support 301, and extends continuously along this upwardly facing surface. In other embodiments, the seal member is, additionally or alternatively, disposed along the downwardly facing surface of the second seal support 300, and/or may not be continuous. It will be apparent that the final stages of vertical movement of the wing tip device 6 into the flight configuration cause compression of the seal member, and that initial vertical movement of the wing tip device 6 out of the flight configuration allow decompression of the seal member. Making and breaking the aerodynamic seal of the wing assembly in this manner, with the seal support surfaces each directed generally normally to the direction of engagement or disengagement, facilitates the reduction of seal breakout forces and a reduced likelihood of damage to the seal or the wing assembly 3.

Vertical or vertically as used herein does not have a strict geometrical meaning, but relates to any movement or direction having a major component generally perpendicular to a chord of the wing, and generally parallel to the ribs of the wing 9. Chordwise as used herein does not have a strict geometrical meaning, but relates to any movement or direction having a major component generally parallel to a chord of the wing, and for example encompasses movements or directions angled relative to the chord by up to about 10-15 degrees, and/or lying transverse to a flexural axis of the wing. Spanwise as used herein does not have a strict geometrical meaning, but relates to any movement or direction having a major component extending along the wing assembly generally perpendicular to a chord of the wing and/or plane of the ribs of the wing 9, and for example encompasses movements or directions angled from the perpendicular to the chord by up to about 10-15 degrees, and/or lying generally parallel to a flexural axis of the wing.

Whilst the present invention has been described and illustrated with reference to particular embodiments, it will be appreciated by those of ordinary skill in the art that the invention lends itself to many different variations not specifically illustrated herein. By way of example the wing tip device need not necessarily be of the shape shown in the drawings but could be of many other shapes. Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A wing assembly for an aircraft, the wing assembly comprising a wing and a wing tip device at the tip of the wing, wherein the wing tip device is moveable between:
   a flight configuration for use during flight, in which the wing tip device projects from the wing for increasing the span of the aircraft, and
   a ground configuration for use during ground-based operations, in which ground configuration the wing tip device is moved away from the flight configuration for reducing the span of the aircraft,
   wherein the wing comprises a spar extension which extends spanwise away from a distal end of the wing, the spar extension having a first end portion fixed in the wing and a second end portion which, in the flight configuration, is disposed in the wing tip device such that, in the flight configuration, the spar extension transmits flight loads between the wing tip device and flight-load bearing structure in the wing, and wherein the wing assembly further comprises an actuation assembly having a telescopic multi-stage linear actuator and a rotary actuator movable by the linear actuator, wherein the rotary actuator is movable in a direction of a vertical axis of the wing tip device, the actuation assembly being configured to move the wing tip device from the flight configuration to the ground configuration, wherein the movement comprises:

initiation of a first movement in which the wing tip device is translated in a direction of a vertically extending axis to a position in which the wing tip device is located clear of the extent of the wing in said direction to permit rotational movement of the wing tip device about the vertically extending axis without obstruction by the wing; and initiation of a second movement in which the wing tip device is rotated about the vertically extending axis such that the span of the wing assembly is reduced.

2. The wing assembly according to claim 1, wherein the wing tip device defines a cavity to receive the second end portion of the spar extension, the cavity opening through a lower surface of the wing tip device such that the second end portion of the spar extension can pass through the opening to permit the wing tip device to move into and out of the flight configuration.

3. The wing assembly according to claim 1, wherein, in the flight configuration, the lowest extent of the spar extension lies within or level with the lower outer surface of the wing tip device.

4. The wing assembly according to claim 1, wherein, in the flight configuration, fore and aft directed faces of the spar extension are disposed within the wing tip device adjacent oppositely facing respective aft and fore directed internal faces of the wing tip device.

5. The wing assembly according to claim 1, wherein the wing assembly comprises a lock arrangement operable to lock the wing tip device to the spar extension in a flight configuration, for flight load transmission between a load bearing structure of the wing tip device and the spar extension, and to unlock the wing tip device from the spar extension to permit movement of the wing tip device into the ground configuration.

6. The wing assembly according to claim 5, wherein the lock arrangement further includes at least one lock actuator configured to move at least one shear pin.

7. The wing assembly according to claim 5, wherein the lock arrangement further includes at least one lock actuator configured to move at least one shear pin, wherein the at one shear pin is movable into and out of a respective receiving opening in the spar extension.

8. The wing assembly according to claim 1, wherein the spar extension has at least one wing spar member comprising an integral portion of a respective spar of the wing, the or each wing spar member continuously extending the or each respective spar of the wing away from the distal end of the wing.

9. The wing assembly according to claim 1, wherein the spar extension has at least one wing spar member fixedly mounted within the wing to a respective spar of the wing.

10. The wing assembly according to claim 1, wherein the spar extension comprises respective fore and aft wing spar members.

11. The wing assembly according to claim 1, wherein the wing tip device comprises at least one flight load bearing tip spar member configured to interface with the or each respective wing spar member for transmission of flight loads therebetween.

12. The wing assembly according to claim 1, comprising a rotary actuator for causing the second movement, the rotary actuator being movable in the direction of the vertical axis with the wing tip device during the first movement.

13. The wing assembly according to claim 1, wherein, in the flight configuration, the lowest extent of the actuation assembly lies above or level with the lower outer surface of the wing assembly.

14. The wing assembly according to claim 1, wherein the wing comprises a compression seal for resisting passage of air through an interface region between the wing and the wing tip device, the seal in the flight configuration being disposed between i) a first seal support surface provided by the wing and facing in a direction of said first movement, and ii) a second seal support surface provided by the wing tip device and facing the first seal support surface.

15. An aircraft comprising a wing assembly, a wing, a wing tip device or an actuation assembly as claimed claim 1.

16. A wing assembly for an aircraft, the wing assembly comprising a wing and a wing tip device at the tip of the wing, wherein the wing tip device is moveable between:

a flight configuration for use during flight, in which the wing tip device projects from the wing for increasing the span of the aircraft, and a ground configuration for use during ground-based operations, in which ground configuration the wing tip device is moved away from the flight configuration, wherein the wing comprises a spar extension which extends spanwise away from a distal end of the wing, the spar extension having a first end portion fixed in the wing and a second end portion which, in the flight configuration, is disposed in the wing tip device such that, in the flight configuration, the spar extension transmits flight loads between the wing tip device and flight-load bearing structure in the wing, and an actuation assembly having a telescopic multi-stage linear actuator and a rotary actuator movable by the first actuator, wherein the rotary actuator is movable in a direction of a vertical axis of the wing tip device.

* * * * *